Jan. 19, 1960

H. A. SIMPSON 2,921,370

PRUNING SAW GUARD AND GUIDE

Filed Dec. 29, 1958

INVENTOR
HENRY A. SIMPSON,

BY Bailey, Stephens & Huettig
ATTORNEYS

Jan. 19, 1960     H. A. SIMPSON     2,921,370
PRUNING SAW GUARD AND GUIDE
Filed Dec. 29, 1958     5 Sheets-Sheet 2
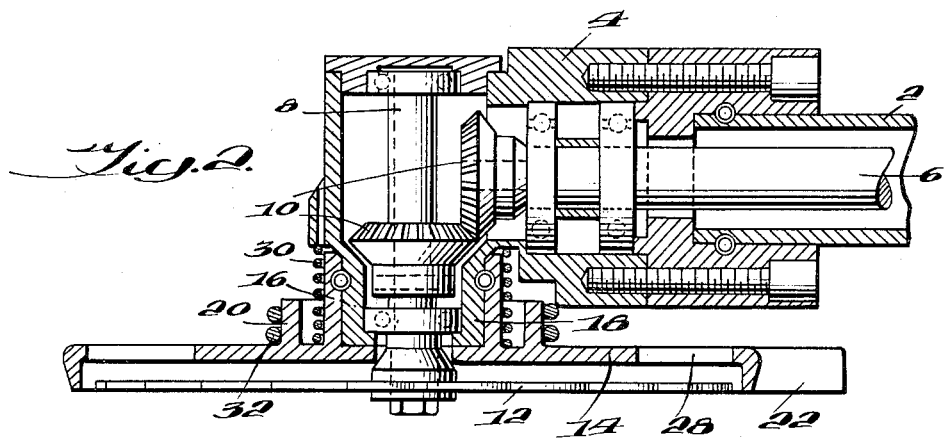
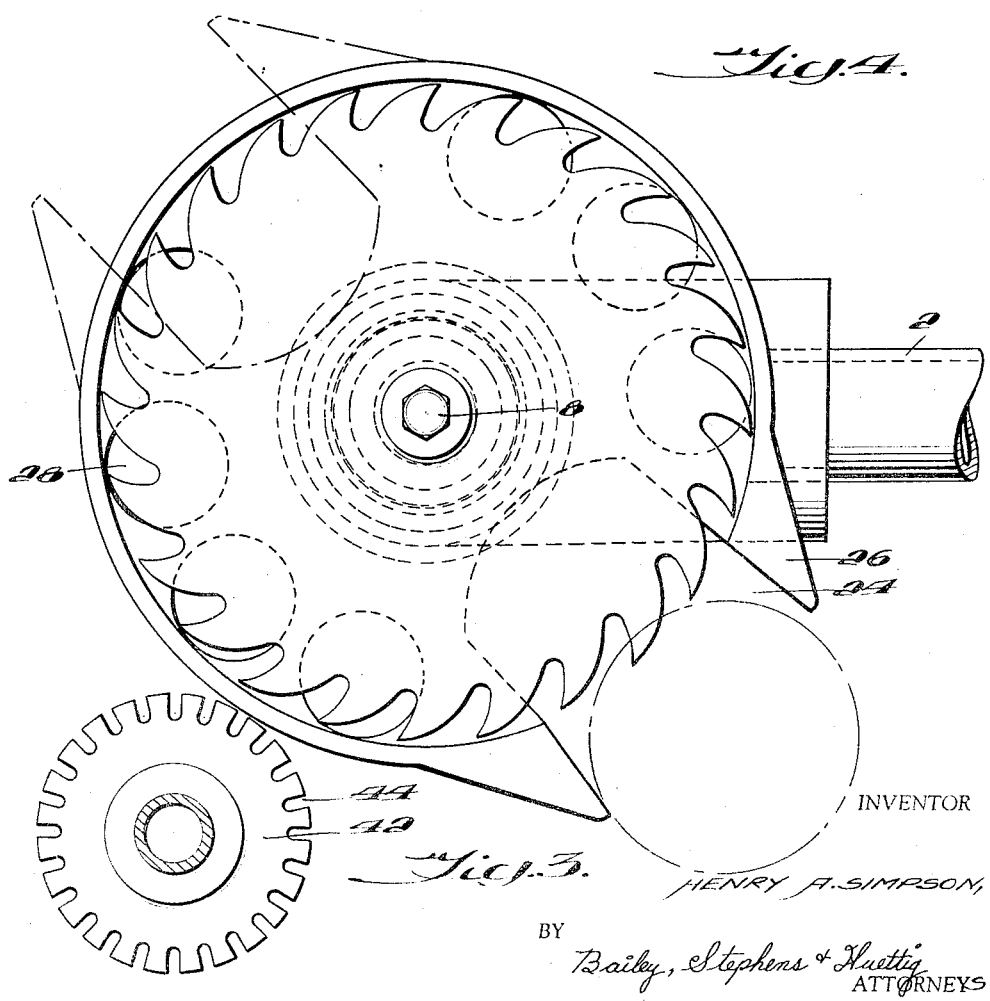
INVENTOR
HENRY A. SIMPSON,
BY
Bailey, Stephens & Huettig
ATTORNEYS INVENTOR
HENRY A. SIMPSON,
BY Bailey, Stephens & Huettig
ATTORNEYS

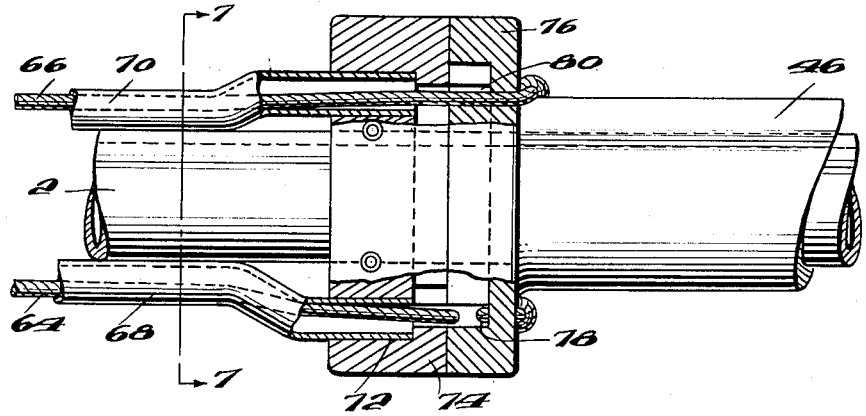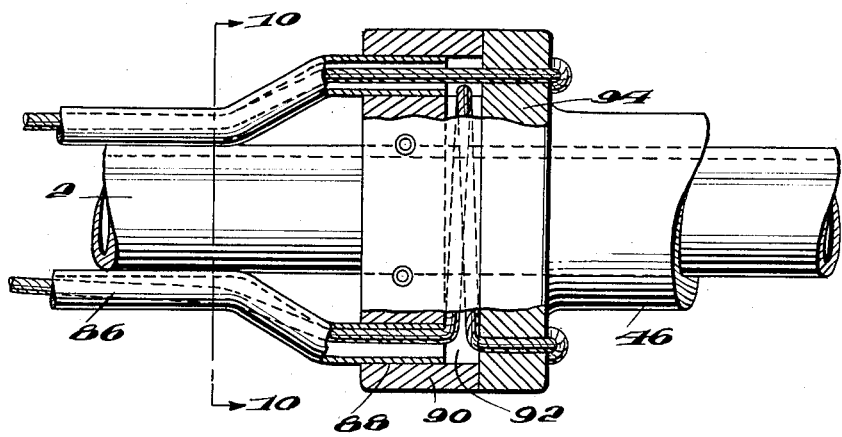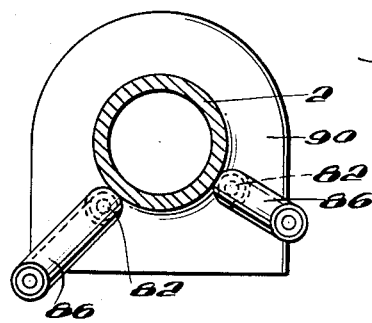

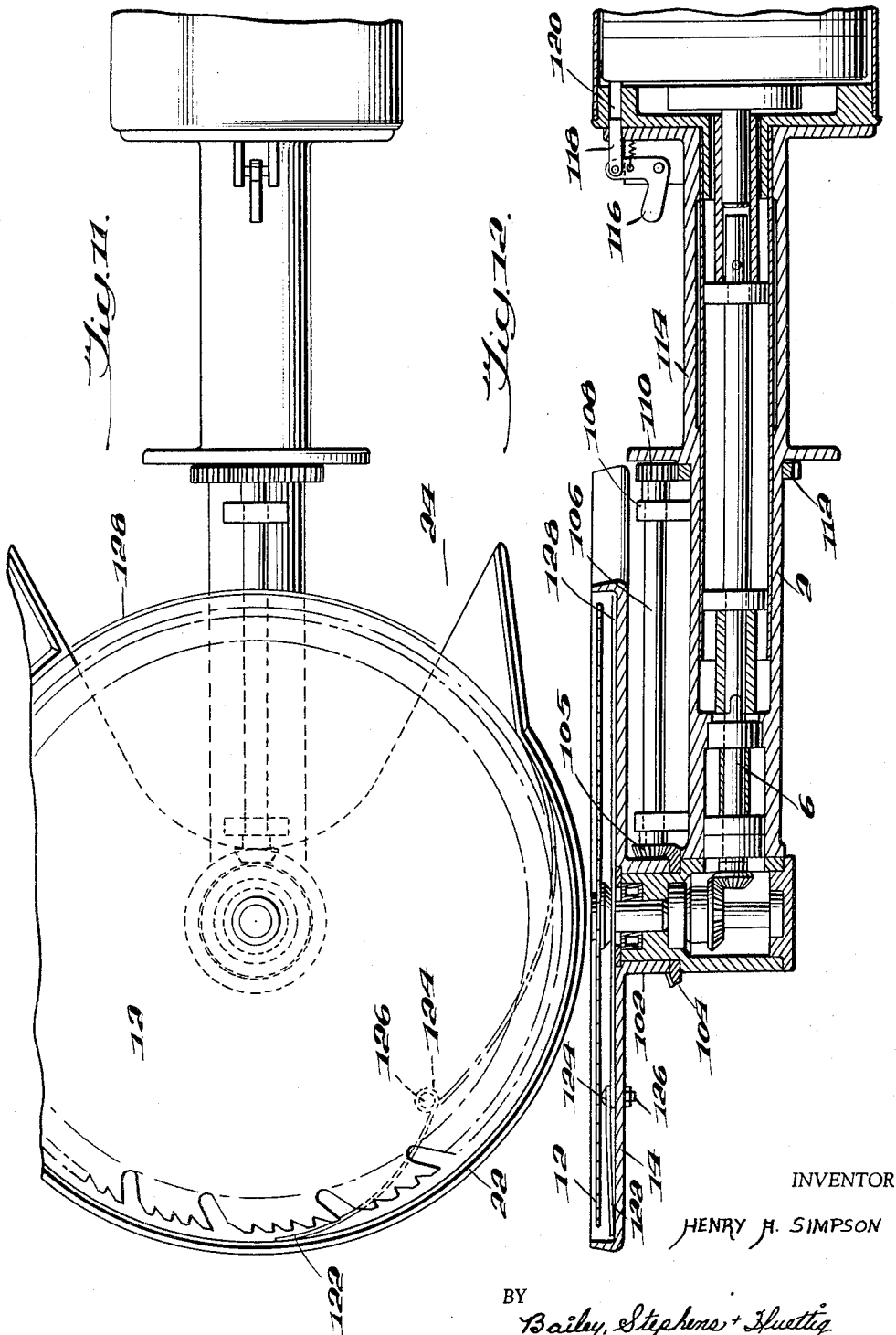

United States Patent Office 2,921,370
Patented Jan. 19, 1960

2,921,370

PRUNING SAW GUARD AND GUIDE

Henry A. Simpson, Geneva, Fla.

Application December 29, 1958, Serial No. 783,355

9 Claims. (Cl. 30—167)

The invention relates to saws, and more particularly to saws of the type used for pruning trees or bushes or for trimming hedges.

Various devices are known for this purpose, which include an elongated stem at the upper end of which is mounted a rotary saw blade which is driven by a shaft extending along the stem and which ordinarily is mounted on an arbor at an angle to the stem axis and is driven through suitable gearing by the shaft.

Various kinds of guards have been proposed for saws of this type in order to prevent damage to the trees. However, insofar as I am aware, such guards as have been previously used do not permit the user to operate the saw at any desired angle against a branch or other piece which is to be cut, while at the same time protecting the remainder of the plant.

The primary object of the present invention is to provide a prunning saw or the like of this type with a guard which completely protects those branches which are not to be cut, while at the same time it permits the user to cut into the desired branch at any angle he may wish, for example, from beneath or above as he may desire.

A further object of the invention is to provide a simple and effective yet inexpensive structure for accomplishing this result.

In general, the invention contemplates a disc mounted on the head which carries the saw arbor to turn about the axis of the arbor. This disc has a flange which will overlie the periphery of a saw disc mounted on the arbor. The disc is interrupted at one point by a radial opening having parallel sides, this opening extending however not more than about 45° around the axis of the disc and thus permitting the saw to cut only within this area. The disc is preferably extended at each edge of the opening to form projections which will guide the limb to be cut to the saw and hold it into position while pushing aside other limbs out of the path of the saw.

The positioning of the disc is controlled by a turnable member mounted on the stem near the handle end thereof. Connection is made to the guide by flexible cables connected to this turnable member, and means are provided for holding the turnable member in various adjusted positions with respect to the stem, so as to hold the guard in any desired position.

Further objects and advantages of the invention will appear more fully from the following description, especially when taken in conjunction with the accompanying drawings which form a part thereof.

In the drawings:

Figs. 1, 1a and 1b show in side elevation with parts cut away a pruning saw embodying the invention;

Fig. 2 is a cross-section through the head of the saw;

Fig. 3 is a fragmentary view of a portion of the locking member;

Fig. 4 is a side elevation of the head of the saw;

Fig. 8 shows in side elevation with parts in section the head of a further modification;

Fig. 9 shows the control mechanism of the device of Fig. 8;

Fig. 10 is a cross-section on the line 10—10 of Fig. 9;

Fig. 11 is a plan view of a modified form of the device; and

Fig. 12 is a cross-section on the line 12—12 of Fig. 11.

Figure 1A:
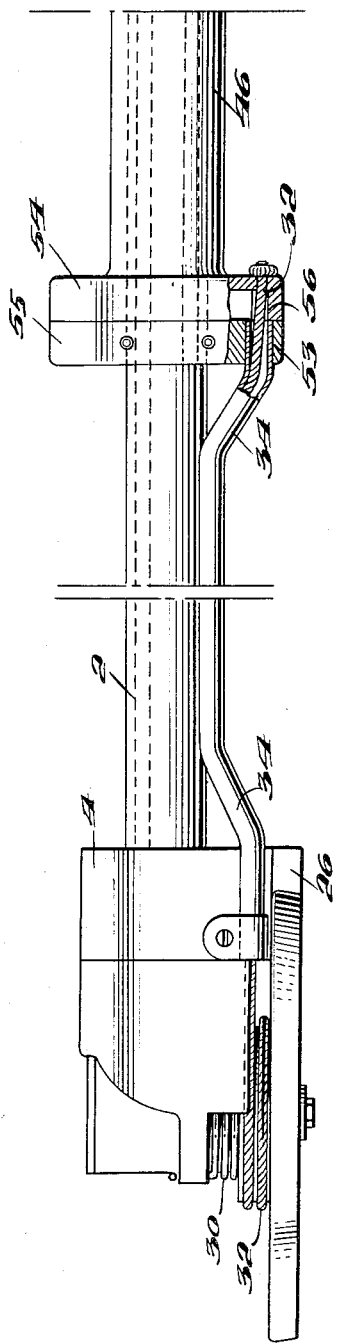
Figure 1B:
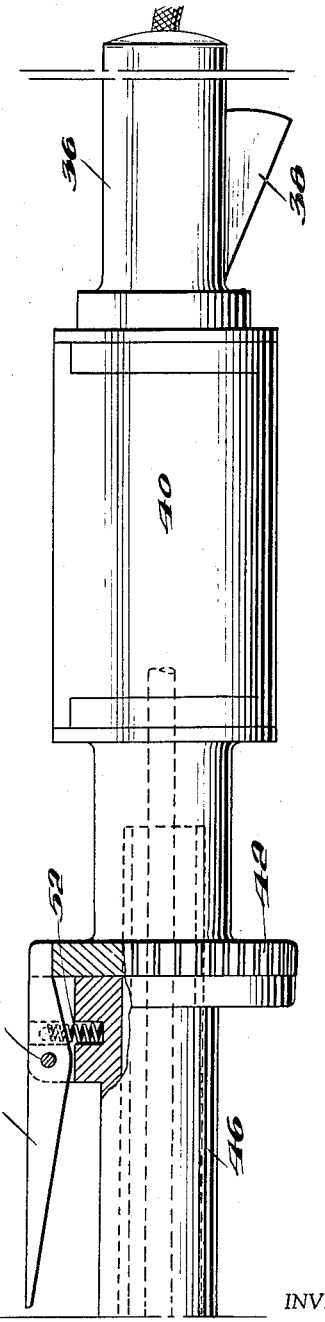

In the form shown in Figs. 1 to 4, I utilize an elongated stem 2 in the form of a tube. This may be of any desired length, for example, from six to fifteen feet. Adjacent the upper end of the stem is a housing 4, in which the outer end of the driving shaft 6 is mounted in suitable bearings. Also mounted in the head is the saw arbor 8, which is connected to the shaft 6 by bevel gears 10. While this arbor is shown at a right angle to the shaft 6, it may be arranged at some other angle if desired. Arbor 8 carries a conventional disc saw 12.

The guarding and guiding arrangement includes a disc 14 having a bearing portion 16 which is turnably mounted on projection 18 of the head 4, concentric with arbor 8, and also having a hub 20. The disc 14 has a lateral flange 22 which surrounds the saw blade 12 except for an opening 24 having substantially parallel side walls and directed radially toward the axis of the disc, extending inwardly almost up to the center radius of the hub 20. On each side of this opening the disc has projections 26 whose inner sides form substantially continuations of the parallel sides of the opening while the outer sides are tapered inwardly toward the disc axis, so as to form guides on each side of the opening 24.

With such a construction, the disc 14 can be turned to any desired position with respect to the head and saw blade. For example, if it is turned to the broken line position of Fig. 4, the saw may be used for cutting inwardly, entering the lower side of a limb. When turned to the full line position of Fig. 4, the saw may be used to cut downwardly as indicated. It can obviously be turned to intermediate positions for cutting to one side or the other as may be necessary to reach the desired branch while protecting other growth. Contact with the saw with any other branches is prevented as the points 26 will tend to direct other branches out of the path of the saw, while acting as guides and holders for ensuring engagement of the saw with the branch to be cut.

It is preferable to provide openings such as 28 in the disc 14 back of the saw blade to permit the escape of the sawdust through such openings.

While the width of the opening 24 may vary somewhat, I prefer that its position at the periphery of the saw should not subtend an angle of about more than 45° at the axis of the arbor 8.

The disc is constantly pulled in one direction, for example, clockwise in Fig. 4, by a spring 30 which is wound around the bearing portion 16 and is connected at one end to the housing 4 and at the other end to the bearing portion. A cable 32 is wound in the oposite direction on hub 20, one end being connected to the hub while the other end extends through a guide tube 34 secured along the length of the stem 2 to a point adjacent the handle portion of the stem.

The handle end of the stem includes a handle 36 out of which projects a switch controlling member 38 for an electric motor 40 which drives the shaft 6. Above the motor 40 is a disc 42 (Fig. 3) which is fixed on the stem and has a series of notches 44 around its periphery. A tubular section 46 is turnably mounted on the stem above the disc 42 and has a locking trigger 48 pivoted at 50 and urged by tension spring 52 into engagement with the notches 44 of disc 42. By grasping the upper part of trigger 48, its lower end can be released from the notches so that the tube 46 can be turned to any desired position.

Tube 34 ends in a hole 53 in a disc 55 fixed on the stem 2. Immediately below disc 55 is a disc 54 which is secured to tubular member 46 and has a groove 56 opposite hole 53. The end of the cable 32 is secured to the disc 54.

By turning the tubular member 46, disc 54 will turn and will draw a portion of cable 32 into the groove 56. This turning movement will then cause turning of the shielding disc 14 against the action of the spring 30 to any desired position. When the desired position is reached, trigger 48 is released and the guide shield will be held in the desired position.

Figure 5:
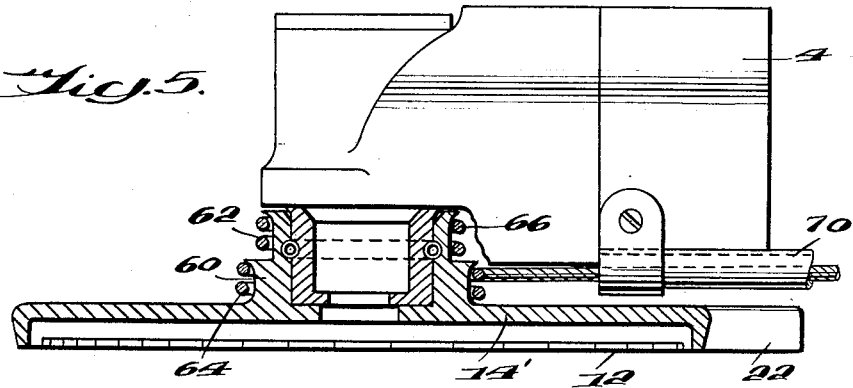
Fig. 5 shows, partly in section, the head of a modified form of the device.
Figure 6:
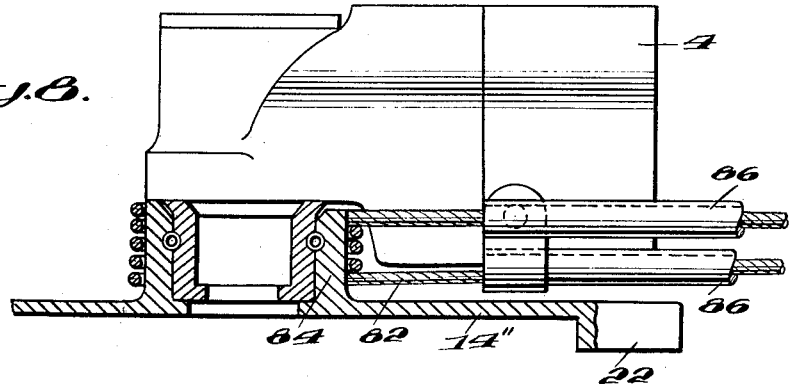
Fig. 6 shows the control mechanism of the device of Fig. 5.
Figure 7:
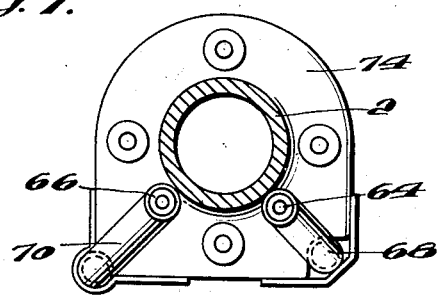
Fig. 7 is a cross-section on the line 7—7 of Fig. 6.

In the form of Figs. 5 to 7, a disc 14' has a hub portion composed of two parts 60, 62 of different diameters upon which are wound in opposite directions cables 64, 66. These cables extend down through guides 68, 70 respectively and pass through holes 72 in a flange 74 fixed on the stem 2. Secured to the manually turnable member 46 is a disc 76 having grooves 78, 80 of different diameters proportional to the difference in diameters of hub portions 60, 62 and in which are secured the ends of the cables 64, 66 respectively.

This structure avoids the use of a spring and the shield will be turned in one direction or the other by turning the control member 46.

In the form of Figs. 8 to 10, disc 14" has a single cable 82 wound around the hub 84 and secured at its center to the hub. The ends of this cable are led through tubes 86 to holes 88 in a flange 90 fixed on the stem 2. This flange has a recess 92 in its lower face. The ends of the cable are crossed over each other in this recess and are secured in a flange or ring 94 fixed on the control member 46. Turning of the control member will therefore determine the position of the shield 14".

In the form of Figs. 11 and 12, the saw is driven in the same manner as in Fig. 2. However, the guard 14 has an extension 102 turnably mounted on casing part 18. Rigid with part 102 is a gear 104 meshing with a gear 106 mounted in brackets 108 fixed on the side of stem 2. At the other end of shaft 106 is a gear 110 meshing with a ring gear 112 fixed to handle 114 which is turnable on the stem 2. This can be secured in various adjusted positions by spring-pressed lever 116 which moves pin 118 into and out of holes in motor casing 120.

Figs. 11 and 12 also show a finger guard which is formed of spring wire, having one end resting against the interior of the saw guard at 122, a part 124 bent into a loop around a retaining bolt or rivet 126, and a part 128 extending across the opening and engaging the inner wall of the guard. This makes it less likely that the user will get his finger into the path of the saw, since it will be felt as the edge of the saw is approached, yet it yields sufficiently to permit the saw to be pushed into the cut without difficulty.

While I have described herein some embodiments of my invention, I wish it to be undersood that I do not intend to limit myself thereby except within the scope of the claims hereto or hereinafter appended.

I claim:

1. A pruning or trimming saw having an elongated stem, a handle at one end of the stem, a shaft running along the stem, means adjacent the handle end of the stem to drive the shaft, a frame at the other end of the stem, a saw arbor rotatably mounted in said frame with its axis at a substantial angle to the longitudinal axis of the stem, means connecting the arbor to the shaft to be driven thereby, a saw guide and shield comprising a disc mounted on said frame for turning about the axis of the arbor and having a flange for overlying the periphery of a disc saw mounted on the arbor, said disc and flange extending substantially continuously around the arbor axis and having a single radial parallel-sided opening whose angular extent is less than about 45°, a control member movably mounted on the handle, and means operatively extending along the stem connecting the control member to the disc to turn the disc about its axis upon movement of the control member.

2. In a saw as claimed in claim 1, said disc having projections therefrom on each side of the opening, the inner sides of such projections forming extensions of the walls of the opening and the outer sides sloping inwardly towards the disc axis.

3. In a saw as claimed in claim 1, said driving means comprising a motor mounted in the handle.

4. In a saw as claimed in claim 1, said disc having a hub portion, said control member comprising a part turnably mounted on the stem about the axis thereof, said connecting means comprising at least one cable having a part wound on said hub portion and connected to said turnable member, and guides on said stem engaging the cable.

5. In a saw as claimed in claim 4, spring means connected to the disc and head for turning the head in the direction opposite to that in which it is moved by said cable.

6. In a saw as claimed in claim 1, said disc having a hub portion, said control member comprising a part turnably mounted on the stem about the axis thereof, said connecting means comprising at least one cable having a part wound on said hub portion and connected to said turnable member, a guide part fixed on said stem adjacent said turnable member and on the side thereof furthest from the handle end, said guide part having at least one hole therein through which said cable extends.

7. In a saw as claimed in claim 1, said disc having a hub portion, said control member comprising a part turnably mounted on the stem about the axis thereof, said connecting means comprising two cables wound in opposite directions on said hub portion and connected to said turnable member, and a guide part fixed on said stem adjacent said turnable member and on the side thereof furthest from the handle end, said guide part having holes therethrough through which said cables extend.

8. In a saw as claimed in claim 1, said control member comprising a part turnable mounted on the stem about the axis thereof, and means for releasably holding said control member in various angular positions around the stem.

9. In a saw as claimed in claim 1, a resilient wire positioned inside said flange having one part secured to the disc and having a free end portion extending across said opening and substantially conforming to the circumference of the flange.

No references cited.